Figure 1:
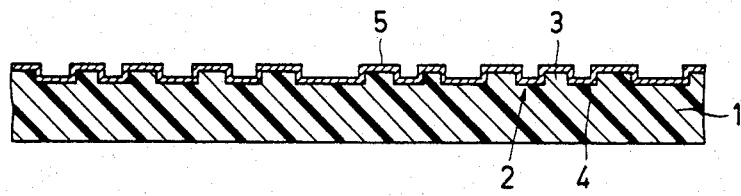

United States Patent [19]

Van de Leest et al.

[11] Patent Number: 4,509,161
[45] Date of Patent: Apr. 2, 1985

[54] OPTICALLY READABLE INFORMATION DISC PROVIDED WITH A REFLECTIVE OPTICAL STRUCTURE

[75] Inventors: Renaat E. Van de Leest; Jan C. Gijsbers, both of Eindhoven, Netherlands

[73] Assignee: U.S. Philips Corporation, New York, N.Y.

[21] Appl. No.: 378,570

[22] Filed: May 17, 1982

[30] Foreign Application Priority Data

Feb. 4, 1982 [NL] Netherlands .......................... 8200415

[51] Int. Cl.³ .......................... G11B 5/62; G01D 15/34
[52] U.S. Cl. .................................... 369/275; 369/288; 369/284; 346/135.1; 430/321; 430/945

[58] Field of Search ...................... 369/275, 284, 288; 346/135.1, 76 L; 365/113; 430/290, 321, 945

[56] References Cited

U.S. PATENT DOCUMENTS 4,430,659 2/1984 Maffitt et al. ................ 346/135.1 X

*Primary Examiner*—Aristotelis M. Psitos
*Attorney, Agent, or Firm*—Norman N. Spain

[57] ABSTRACT

An optically readable information disc having a reflective optical structure which comprises a reflective layer which is composed of a nitride, carbide or boride of a transition metal selected from the group consisting of titanium, zirconium, hafnium, vanadium, chromium, niobium, molybdenum, lanthanum, tantalum and tungsten.

4 Claims, 3 Drawing Figures

OPTICALLY READABLE INFORMATION DISC PROVIDED WITH A REFLECTIVE OPTICAL STRUCTURE

The invention relates to an optically readable information disc comprising a substrate plate which is provided on one side or on both sides with a reflective optical structure.

The optically readable information discs can be divided into two major types. The first major type comprises discs which at manufacture have been provided with all the information which can be read (displayed) optically, for example, video information or audio information. Discs having video information, for example, a motion picture, are termed VLP (Video Long Play) discs and discs having audio information, the alternative of the known grammophone record, are known by the name of ALP (Audio Long Play) discs or compact discs. The latter term relates to the small diametrical dimensions of the disc in the order of magnitude of 10–50 cm. Such discs of the first type might be called "pre-recorded" discs in order to denote that all desired information has already been introduced during manufacture of the discs.

These discs are manufactured in large numbers from synthetic resin by means of a compression process, injection moulding process or moulding process. In the process dies are used which at the surface carry an optical structure which is copied in the plastic information disc to be manufactured. The resulting plastic product is provided with a reflective layer of Ag or Al on the side of the optical structure.

The second major type relates to discs which in the factory have not or only partly been provided with optically readable information. The user himself may record the information he desires by means of pulsated laser light. The information thus recorded can be read optically. Such a disc is sometimes termed optical recording disc. The recording disc comprises a substrate plate which is preferably transparent and is manufactured from a transparent synthetic resin or preferably from glass. The substrate plate is provided on one or both sides with a recording layer comprising material which is sensitive to laser light for example, tellurium or a tellurium compound. By exposure to laser light which is pulsated in accordance with the information to be recorded, holes are formed in the recording layer. The obtained information bits can be read in reflection or in transmission by means of laser light. It has also been suggested to use a multilayer system in an optical recording disc so as to absorb laser light as much as possible upon recording information. Such a multilayer system comprises a reflective layer, a transmission layer and an absorption layer. In this connection reference may be made to Netherlands patent application No. 7903915 (PHN 9461) in the name of Applicants corresponding to U.S. application Ser. No. 146,547, filed May 5, 1984 and now abandoned.

The optical discs of the above-described types are sufficiently known from literature and moreover are commercially available. For example, for information discs of the first type reference may be made to Netherlands patent application No. 7611395 (PHN 8576) in the name of Applicants and corresponding to U.S. Pat. No. 4,275,091. The second type of information discs has been known since the beginning of the seventies. Reference may be made to Netherlands patent application No. 7906728 (PHN 9571) in the name of Applicants and corresponding to U.S. Pat. No. 4,318,112. The last-mentioned literature reference describes an optical recording disc which has an ablative recording layer in which molten areas are formed by exposure to laser light which areas under the influence of surface tension burst open under formation of a hole. In U.S. Pat. No. 1,117,419 a recording layer is disclosed which comprises a dye incorporated in a binder. Upon exposure to laser light the dye decomposes and in this manner colourless information areas (bits) in a coloured background are obtained.

The use of a reflective layer of Ag or Al in information discs of the first type has the difficulty that the stability of the layer, in particular in the longer run, leaves clearly to be desired. In the long run, an Al layer shows holes which detrimentally influence the quality of the optical structure. The chemical and physical stability of Al have proven to be insufficient. An Ag layer has a slightly better resistance to oxidative attack but it has the disadvantage that in the long run black colouring occurs which makes the product less attractive. The adhesion of a vapour-deposited or sputtered silver layer on a synthetic substratum, for example a substratum of an acrylate synthetic resin or methacrylate synthetic resin, also presents problems.

In information discs of the second type the physical and chemical stability of the optical structure comprising information bits provided in a recording layer formed of a tellurium alloy, is not optimum. In the long run the recording layer shows a reduction in quality as a result of attack, for example oxidation. Moreover, a tellurium-containing layer is posonous.

Dye-containing layers, as described in the above-mentioned U.S. Patent Specification, are not stable for long periods. The dye shows a dark reaction in which discolouring takes place without the disc being exposed to laser light. The dye-containing layer cannot be read in reflection, which has several process-technical disadvantages.

According to the invention, an optically readable information disc is provided which does not have the above-mentioned disadvantages or to a considerably reduced extent. More in particular the invention relates to an optically readable information disc which comprises a substrate plate which on one side or on both sides has a reflective optical structure which has a reflective layer which is composed of a nitride, carbide or boride of a transition metal which is selected from the group consisting of titanium, zirconium, hafnium, chromium, niobium, molybdenum, lanthanum, tantalum, vanadium and tungsten.

The nitrides, carbides and borides of the above-mentioned metals are stable compounds. They are not attacked by water or aqueous solutions of weak acids and bases. These substances are also not sensitive to air-oxidation at normal ambient temperature. Only at higher temperatures of approximately 400° C. air-oxidation does take place. Further, these compounds are physically stable and furthermore show a very large resistance to mechanical forces. These are extremely hard materials which are resistant to detrition and has an excellent scratch resistance. The hardness is approximately 1000–3000 kg/mm$^2$. The compounds have a high melting-point of 2000°–4000° C. in a cavuum. A layer composed of the above-mentioned nitride, carbide or boride adheres excellently to substantially any substratum, in particular to synthetic resin and to glass. The layer follows the contours of the optical structure satisfactorily, which is of great importance for the quality of the reflective optical structure. It should be borne in mind that the structure details have very small dimensions of approximately 0.1 μm to 3 μm.

The use of the nitride of titanium, zirconium or hafnium is to be preferred. In particular titanium-nitride is very interesting also due to the comparatively favourable cost-price. In addition to an excellent resistance to detrition and corrosion, said nitrides show a good reflection in particular at higher wavelengths, that is to say in the red range and infrared range from a wavelength of 600 nm. The degree of reflection depends not only on the wavelength but also on the thickness of the layer and the composition thereof. For example, the value of the reflection depends on the nitrogen content of the nitride used, for example, titanium nitride. Beautiful gold-coloured layers can be obtained with the nitrides, which adds very much to the appearance of the product.

The reflective layer of the above-mentioned nitride, carbide or boride used in the disc according to the invention is preferably provided by means of a known sputtering process which is a physical deposition process from the vapour phase (PVD=physical vapour deposition). A layer of nitride or carbide is preferably provided by means of the known reactive magnetron sputtering process as described, for example, in Thin Solid Films 72 (1980), pp. 535–540. In a reactive magnetron sputtering process for the manufacture of a layer of nitride, nitrogen is used as a reactive gas. The plasma is argon and the target is the transition metal chosen. In carbides, methane or acetylene is used as a reactive gas. The plasma is argon and the target is the desired transition metal. In the manufacture of the boride layer, no reactive magnetron sputtering process may be used. A boride layer is manufactured according to a normal magnetron sputtering process in which the target material is composed of the boride of one of the above-mentioned transition metals. The magnetron sputtering process can be carried out at a comparatively low temperature, for example, at 40°–50° C.

As a result of this the reflective layer may be provided on substrates of synthetic resin, for example, a substrate of polycarbonate, polyacrylate or polymethylmethacrylate, without the substrate being deformed by thermal energy. This is of great importance due to the fineness of the optical structure with details in the order of magnitude of one micron or tenth parts of a micron.

The reflection characteristic of the layer obtained by means of a reactive magnetron sputtering process depends on the concentration of the reactive gas in the sputter plasma. In the table below the reflection characteristic of a titanium nitride layer having a thickness of approximately 80 nm is recorded dependent on the composition of the sputtering gas. The reactive gas is $N_2$, the plasma is Ar.

| TABLE OF REFLECTION OF TITANIUM NITRIDE LAYER | | | | | | | |
|---|---|---|---|---|---|---|---|
| No. experiment | sputtering gas composition | % $N_2$ in sputtering gas | Total reflection in % at different wavelengths | | | | |
| | | | 400 nm | 500 nm | 600 nm | 700 nm | 800 nm |
| 1 | $9.5 \times 10^{-4}$ Torr Ar $2.1 \times 10^{-4}$ Torr $N_2$ | 18.1 | 36 | 47.5 | 53 | 56 | 58 |
| 2 | $9.3 \times 10^{-4}$ Torr Ar $2.3 \times 10^{-4}$ Torr $N_2$ | 19.2 | 20.5 | 42.5 | 57 | 65 | 70 |
| 3 | $9.0 \times 10^{-4}$ Torr Ar $2.6 \times 10^{-4}$ Torr $N_2$ | 22.4 | 17.5 | 36.5 | 56.5 | 67.5 | 73.5 |
| 4 | $8.5 \times 10^{-4}$ Torr Ar $3.1 \times 10^{-4}$ Torr $N_2$ | 26.7 | 17.5 | 29 | 51 | 64.5 | 71 |
| 5 | $8.0 \times 10^{-4}$ Torr Ar $3.6 \times 10^{-4}$ Torr $N_2$ | 31.0 | 20.5 | 25.5 | 44.5 | 59.5 | 68 |

The layer obtained in experiment no. 3 has a typical golden-yellow colour. At slightly lower nitrogen percentages of approximately 20% (experiment 2) the colour becomes slightly lighter yellow. At higher nitrogen percentages (experiments 4, 5) the colour becomes slightly redder as a result of the lower reflections at 500 and 600 nm.

Due to the high reflections at 800 nm, the optical information disc according to the invention may be read with an AlGaAs (aluminum, gallium, arsenic) laser which as regards cost-price and dimensions has significant advantages as compared with other lasers, for example a gas laser. The AlGaAs laser has an emission wavelength of approximately 815 nm.

In an embodiment which is interesting for practical applications the information disc in accordance with the invention comprises a substrate plate which on one side or on both sides has a spiral-like information-track or an information-track built up from concentric circles which has a crenellated profile of information areas situated alternately at a higher level and at a lower level and which can be read in a reflective mode by means of laser light on the basis of phase-differences and is covered with a reflective layer which is composed of a nitride, carbide or boride of a transition metal as mentioned above.

The information disc according to the above embodiment belongs to the previously described first major type. No information is written in the reflective layer. The reflective layer preferably has an as large as possible reflectivity, in particular at higher wavelengths of approximately 800 nm and in this connection has a layer thickness from 50 to 100 nm.

In a second favourable embodiment the optically readable information disc has a substrate plate which is provided on one side or on both sides with a reflective layer which is composed of a nitride, carbide or boride of a transition metal as described above, in which the reflective layer comprises an information track of information areas which are composed of the oxide of the transition metal, which information areas have been obtained by exposing the reflective layer to pulsated laser light and which information areas can be read by means of laser light on the basis of reflection differences.

This information disc belongs to the above-described second type. The user of the information disc can record information in the reflective layer by using laser light which is pulsated in accordance with the information. Upon exposure to laser light a high temperature will occur in the exposed places of the reflective layer so that the material (nitride, carbide or boride) is rapidly converted into the corresponding oxide in the presence of air-oxygen. The oxide regions formed are sufficiently transparent and have a much lower light reflection than the non-converted material present around the area. On the basis hereof the areas can be read in reflection by means of laser light. The amount of laser light energy required to make an optically readable bit in the reflective layer must preferably be as small as possible. This can be realized by using an as thin as possible layer having a thickness of, for example, 5-25 nm. Experiments have demonstrated that an information bit having a diameter of 1 $\mu m$ can be provided in a layer of titanium nitride having a thickness of 15 nm, manufactured according to the process conditions mentioned in experiment 4 of the above table, by exposure to pulsated laser light having a wavelength of 800 nm and an energy of 2.8 nJ per pulse. The reflection of such a thin layer of titanium nitride at 800 nm is 34%, which is sufficient for a reliable reading of recorded information. The reading of recorded information is carried out by means of laser light which is considerably weaker than the laser light used for recording, for example, with laser light which is less energy-intensive by a factor 10 to 100.

Between the substrate and the reflective layer an intermediate layer of synthetic resin may be provided such as a layer of light cured acrylates. The surface of the substrate facing the reflective layer or the intermediate layer may comprise an information track which can be read optically by means of laser light in a reflective mode. Such information track, also called servo-track, has a crenellated structure of information bits situated alternately at a higher and lower level. The servo track comprises information with respect to the site and speed of recording. The track is scanned by laser light which is much weaker than that used at recording.

Figure 2:
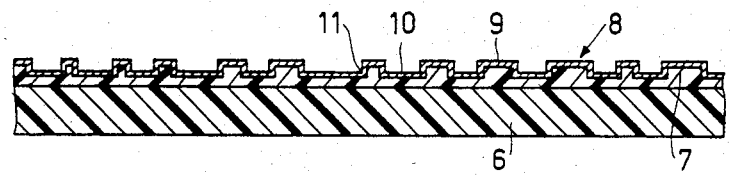
Figure 3:
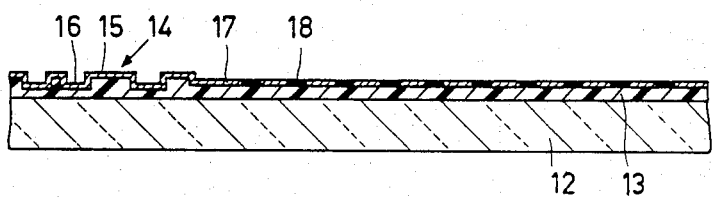

The invention will now be described in greater detail with reference to the drawing, in which FIG. 1 is a cross-sectional view of an information disc according to the invention, FIG. 2 is a cross-sectional view of another embodiment of an information disc in accordance with the invention, and FIG. 3 is a cross-sectional view of still another embodiment of the disc in accordance with the invention.

Reference numeral 1 in FIG. 1 denotes a substrate plate of polycarbonate having a thickness of 1.2 mm and a diameter of 11 cm. Substrate plate 1 is provided on one side with an optically readable information track 2 provided by means of an injection moulding process. Track 2 has a crenellated profile of information areas 3 situated at a higher level and information areas 4 situated at a lower level. The difference in level between areas 3 and 4 is $\lambda/4d$, where $\lambda$ is the wavelength of the laser light with which the information track is read and d is the refractive index. At $\lambda = 800$ nm the difference in level is approximately 1.1 $\mu m$. The longitudinal dimensions of the information areas vary in accordance with the information and are from 0.2 to 3 $\mu m$. The information track 2 is covered with a reflective layer 5 of titanium nitride having a thickness of 60 nm. Layer 5 is provided by means of a magnetron reactive sputtering process as described above in the preamble. The information track 2 is read by means of laser light originating from an AlGaAs laser which is focused on the information track via the substrate plate 1. Reading is carried out on the basis of phase differences between the forward laser light beam and the laser light beam reflected by layer 5. In the information areas 4 situated at a lower level, extinction of the laser light takes place. The adhesion of layer 5 to substrate plate 1 is excellent.

Reference numeral 6 in FIG. 2 denotes a substrate disc of polymethyl methacrylate having a thickness of 1.2 mm. Substrate disc 6 is provided on one side with a light-cured lacquer layer 7 on the basis of acrylates in which an information track 8 has been provided by means of a moulding process. The information track 8 comprises information areas at a higher level 9 and at a lower level 10. The difference in level is approximately 1.1 $\mu m$. The longitudinal dimensions of the respective areas vary from 0.2 to 3 $\mu m$. The track is covered with a layer 11 of titanium nitride, hafnium nitride or zirconium nitride and has a thickness of 70 nm. The track is read in reflection via the transparent substrate 6 and the transparent lacquer layer 7 by means of laser light originating from an AlGaAs laser having an emission wavelength of 815 nm. The adhesion of layer 11 to lacquer layer 7 is excellent, as appears from the cross-cut scratch test. According to the test, six parallel scratches are provided in the layer 11 at a mutual distance of 1 mm. The scratching depth is equal to the thickness of layer 11 so that this is cut through entirely. The above-mentioned scratches are crossed at right angles by six other parallel scratches also at a mutual distance of 1 mm, so that 25 areas having an area of 1 mm² are obtained. An adhesive tape (cellotape) is provided over the regions and is then pulled off. None of the regions proved to be removed by the adhesive tape so that the adhesion of layer 11 may be said to be good. If desired, a lacquer layer not shown in the Figure may be provided on layer 11.

Reference numeral 12 in FIG. 3 denotes a substrate plate of glass having a thickness of 1.2 mm. The disc is provided on one side with a light-cured lacquer layer 13 on the basis of acrylates. An optically readable servo-track 14 is provided in the lacquer layer and has data as regards the place and speed of recording of information. The servo track 14 has a crenellated profile of information areas 15 situated at a higher level and information areas 16 situated at a lower level. The difference in level is $\lambda/4d$; the longitudinal dimensions of the area vary from approximately 0.2 to 3 $\mu m$. The servo track is read in reflection by means of laser light which is focused on the track 14 via the transparent plate 12 and the transparent lacquer layer 13. Lacquer layer 13 is covered with a layer 17 of titanium nitride provided by means of a magnetron reactive sputtering process. Layer 17 has a thickness of 15 nm. The reflection of layer 17 at a wavelength of 800 nm is 34%. In the parts not provided with servo data the layer 17 comprises optically readable information bits 18 having a diameter of 1 $\mu m$. The bits comprise titanium oxide and have been obtained by exposing layer 17 to pulsated laser light originating from an AlGaAs laser having a capacity of 28 mW on the layer and a pulse time of 0.1 $\mu$ sec. As a result of the exposure the nitride is converted into titanium oxide in the exposed placed under the influence of oxygen.

If desired, the layer 13 may be omitted, the servo track 14 being provided in the substrate plate which then is preferably manufactured from a synthetic resin. A synthetic resin substrate having a servo track can simply be manufactured by means of an injection moulding process. If less accurate registration will suffice, in which an exact position of the information areas 18 is not necessary, the servo track 14 may also be omitted.

What is claimed is:

1. An optically readable information disc comprising a substrate plate provided on one side or on both sides with a reflective optical structure provided with reflective layer composed of a nitride, carbide or boride of a transition metal selected from the group consisting of titanium, zirconium, hafnium, vanadium, chromium, niobium, molybdenum, lanthanum, tantalum and tungsten.

2. An optically readable information disc as claimed in claim 1, in which the reflective layer is composed of a nitride of titanium, zirconium or hafnium, 3. An optically readable information disc as claimed in claim 1 or 2, comprising a substrate plate which is provided on one side or on both sides with a spiral-like information track or an information track which is built up from concentric circles and has a crenellated profile of information areas situated alternately at a higher level and at a lower level and which can be read by means of laser light on the basis of phase differences and is covered with a reflective layer as claimed in claim 1 or 2.

4. An optically readable information disc as claimed in claim 1 or 2 having a substrate plate which is provided on one side or on both sides with a reflective layer as claimed in claim 1 or 2, which comprises an information track of information areas composed of the oxide of a transition metal as claimed in claim 1 or 2, in which the information areas have been obtained by exposing the reflective layer to pulsated laser light and in which the information areas can be read by means of laser light on the basis of reflection differences.

* * * * *